United States Patent
Ikeda (10) Patent No.: US 12,401,079 B2
(45) Date of Patent: Aug. 26, 2025

(54) ALL-SOLID-STATE BATTERY

(71) Applicant: TOYOTA JIDOSHA KABUSHIKI KAISHA, Toyota (JP)

(72) Inventor: Yuki Ikeda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 558 days.

(21) Appl. No.: 17/929,051

(22) Filed: Sep. 1, 2022

(65) Prior Publication Data

US 2023/0147419 A1 May 11, 2023

(30) Foreign Application Priority Data

Nov. 11, 2021 (JP) ................................ 2021-184117

(51) Int. Cl.
| | |
|---|---|
| *H01M 10/0585* | (2010.01) |
| *H01M 50/105* | (2021.01) |
| *H01M 50/14* | (2021.01) |
| *H01M 50/586* | (2021.01) |
| *H01M 50/593* | (2021.01) |

(52) U.S. Cl.
CPC ....... *H01M 50/14* (2021.01); *H01M 10/0585* (2013.01); *H01M 50/105* (2021.01); *H01M 50/586* (2021.01); *H01M 50/593* (2021.01); *H01M 2300/0065* (2013.01)

(58) Field of Classification Search
CPC ............. H01M 10/0585; H01M 50/14; H01M 50/105; H01M 50/593
See application file for complete search history.

(56) References Cited

U.S. PATENT DOCUMENTS

| | | | |
|---|---|---|---|
| 2012/0225347 A1* | 9/2012 | Kojima | ............... H01M 50/528 |
| | | | 429/159 |
| 2021/0104775 A1 | 4/2021 | Ono et al. | |
| 2021/0203008 A1 | 7/2021 | Yoshioka et al. | |

FOREIGN PATENT DOCUMENTS

| | | | | |
|---|---|---|---|---|
| JP | 2010235656 A | | 10/2010 | |
| JP | 5290520 B2 | * | 9/2013 | ......... H01M 50/116 |
| JP | 2017220447 A | * | 12/2017 | ........ H01M 10/0404 |
| JP | 6445601 B2 | | 12/2018 | |
| JP | 2021057321 A | | 4/2021 | |
| JP | 2021114374 A | | 8/2021 | |
| WO | 2020/054549 A1 | | 3/2020 | |

* cited by examiner

*Primary Examiner* — Kevin E Yoon
(74) *Attorney, Agent, or Firm* — Dickinson Wright, PLLC (57) ABSTRACT

An all-solid-state battery includes: an electrode body that is provided with a laminate including an anode current collector layer, an anode composite material layer, a solid electrolyte layer, a cathode composite material layer, and a cathode current collector layer; an outer encasement member that envelops the electrode body; and a protective member with electrically insulating properties that is disposed on a side surface of the laminate. The protective member has a groove extending along a direction in which a surface of the laminate extends.

13 Claims, 7 Drawing Sheets

ALL-SOLID-STATE BATTERY

CROSS-REFERENCE TO RELATED APPLICATION

This application claims priority to Japanese Patent Application No. 2021-184117 filed on Nov. 11, 2021, incorporated herein by reference in its entirety.

BACKGROUND

1. Technical Field

The present disclosure relates to an all-solid-state battery.

2. Description of Related Art

Japanese Unexamined Patent Application Publication No. 2017-220447 (JP 2017-220447 A) discloses a structure in which a side surface of an electrode laminate is sealed with a cured resin, and Japanese Unexamined Patent Application Publication No. 2021-057321 (JP 2021-057321 A) discloses a technology in which an insulating layer is disposed at an anode end portion.

SUMMARY

When the cured resin is disposed so as to cover the side surface of the electrode laminate as in JP 2017-220447 A, the electrode laminate can be fixed. However, when such an electrode laminate is sealed with an outer encasement member such as a laminate sheet or the like, the cured resin may damage the outer encasement member by perforating or the like, resulting in reduction of structural reliability (i.e., that a battery has structural stability in order to appropriately exhibit functions of the battery).

In view of the above related art, the present disclosure provides an all-solid-state battery of which the structural reliability can be improved.

The present application is an all-solid-state battery, including an electrode body that is provided with a laminate including an anode current collector layer, an anode composite material layer, a solid electrolyte layer, a cathode composite material layer, and a cathode current collector layer, an outer encasement member that envelops the electrode body, and a protective member with electrically insulating properties that is disposed on a side surface of the laminate. The protective member has a groove extending along a direction in which a surface of the laminate extends.

In the all-solid-state battery, a plurality of the grooves may be arrayed in a laminating direction of the laminate.

In the all-solid-state battery, an elastic modulus of the protective member may be 1 MPa or more and 500 MPa or less.

In the all-solid-state battery, at least one of the grooves may be located at a position that is located away by a predetermined distance in the laminating direction from one of both end portions of the protective member in the laminating direction.

In the all-solid-state battery, an external corner portion at the end portion of the protective member in the laminating direction of the laminate may be provided with an inclined surface or a curved surface.

In the all-solid-state battery, the protective member may include a first end portion in a width direction of the protective member and a second end portion in the width direction, the external corner portion is located on the second end portion, the first end portion is disposed on a side of the protective member that is disposed on the side surface of the laminate, and the second end portion is disposed on a side of the protective member that is opposite from the first end portion.

In the all-solid-state battery, the external corner portion may be located at a position in contact with the outer encasement member.

According to the all-solid-state battery of the present disclosure, the protective member disposed on the side surface of the laminate can suppress trouble from occurring in the outer encasement member, and improve structural reliability. This is because the protective member is configured with high conforming properties, so that the protective member is deformed when an external force is applied to the protective member or when the protective member comes into contact with the outer encasement member, and the force is absorbed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

1. All-Solid-State Battery

Figure 1:
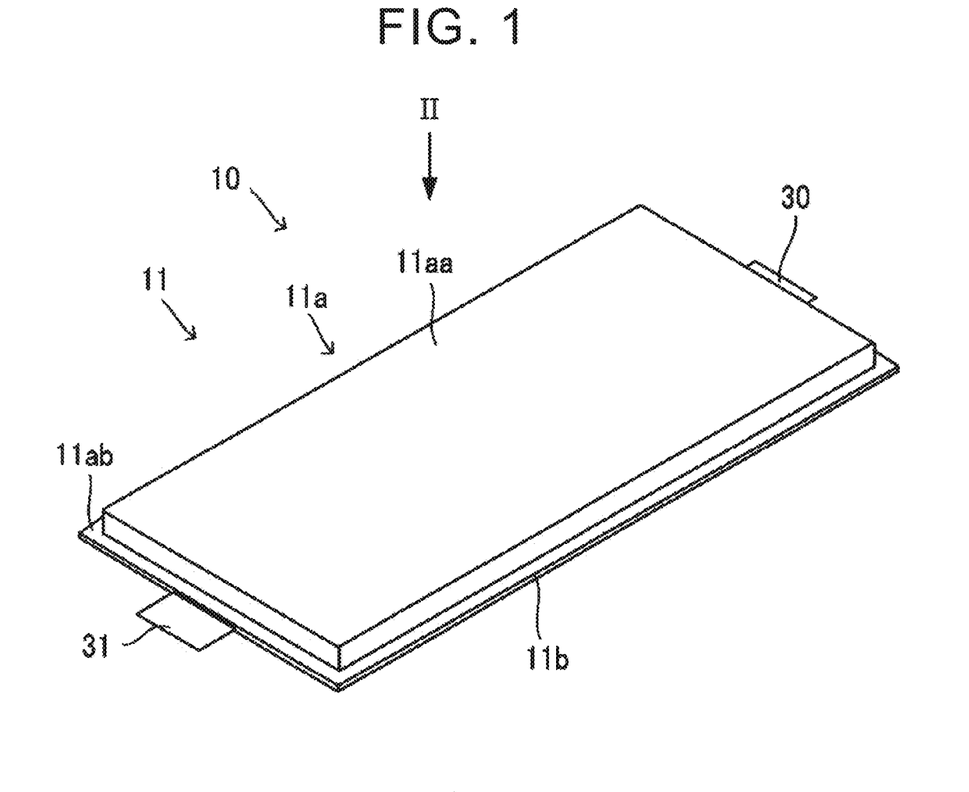
FIG. 1 is an external perspective view of an all-solid-state battery 10.
Figure 2:
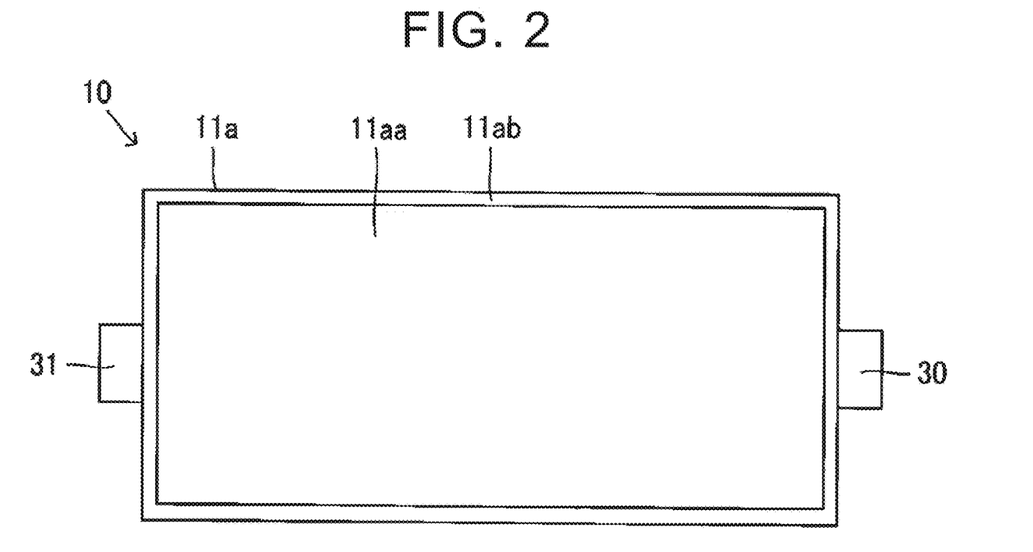
FIG. 2 is a plan view of the all-solid-state battery 10.
Figure 3:
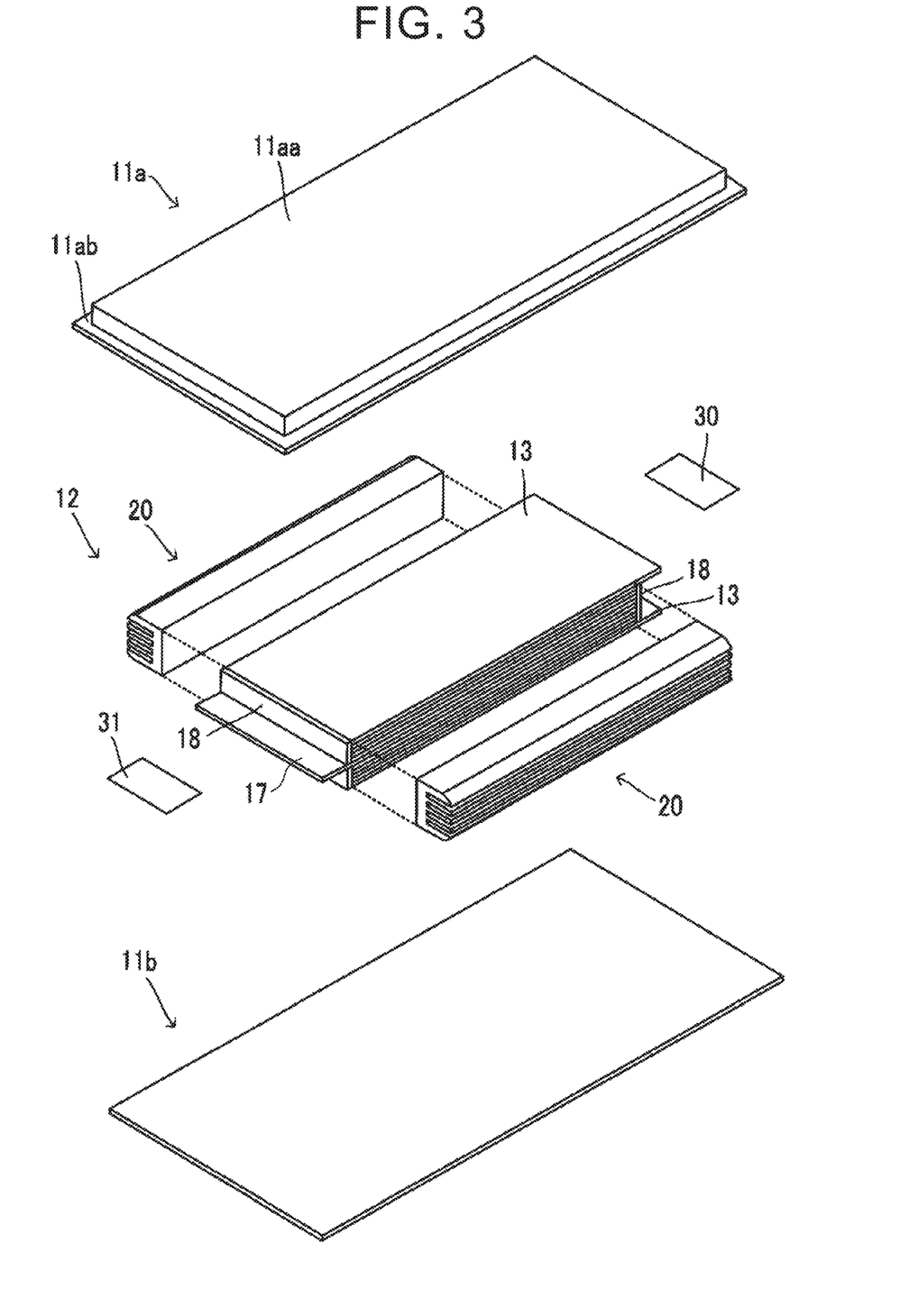
FIG. 3 is a disassembled perspective view of the all-solid-state battery 10.
Figure 4:
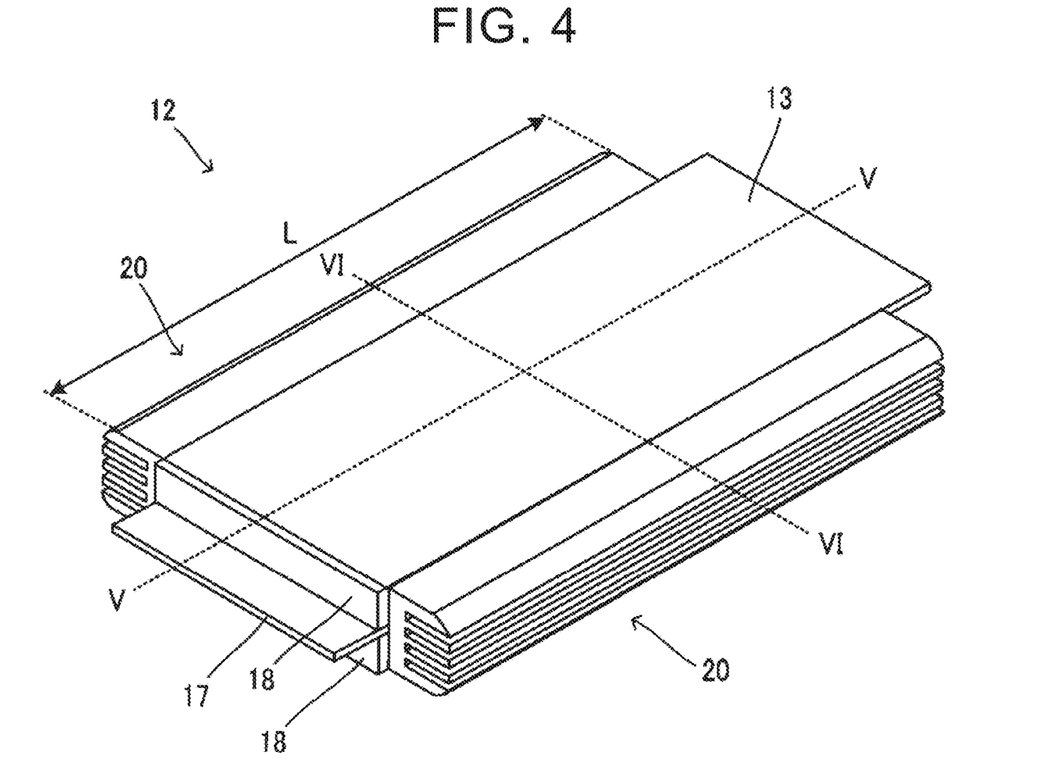
FIG. 4 is an external perspective view of an electrode body 12.
Figure 5:
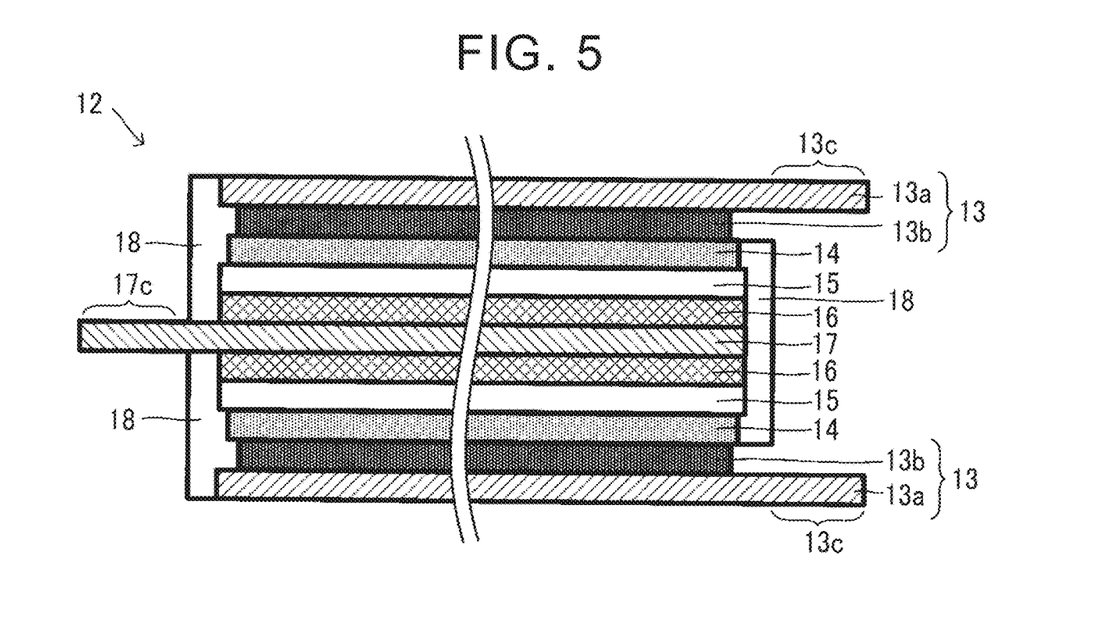
FIG. 5 is a sectional view of the electrode body 12 taken along a line indicated by V-V in FIG. 4.
Figure 6:
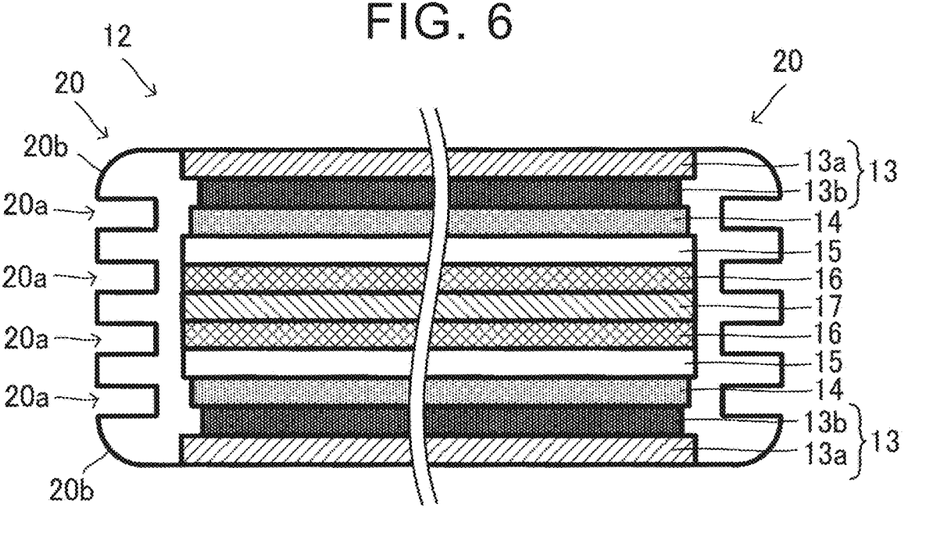
FIG. 6 is a cross-sectional view of the electrode body 12 taken along a line indicated by VI-VI in FIG. 4.

FIGS. 1 to 3 are diagrams illustrating an all-solid-state battery 10 according to an embodiment. FIG. 1 is an external perspective view, FIG. 2 is a plan view (as viewed from a direction of arrow II in FIG. 1), and FIG. 3 is a disassembled perspective view. Further, FIG. 4 is an external perspective view illustrating an electrode body 12 disposed inside an outer encasement member 11 of the all-solid-state battery 10, FIG. 5 is a sectional view of the electrode body 12 taken along a line indicated by V-V in FIG. 4, and FIG. 6 is a cross-sectional view of the electrode body 12 taken along a line indicated by VI-VI in FIG. 4.

As can be seen from FIGS. 1 to 6, the all-solid-state battery 10 according to the present embodiment has the outer encasement member 11, the electrode body 12, an anode terminal 30, and a cathode terminal 31. The electrode body 12 is enveloped by the outer encasement member 11, and each of the anode terminal 30 and the cathode terminal 31 is disposed so that one end thereof is connected to the electrode body 12 and the other end protrudes from the outer encasement member 11.

The electrode body 12 has anode current collector layers 13, anode composite material layers 14, separator layers 15, cathode composite material layers 16, a cathode current collector layer 17, insulating members 18, and protective members 20. In the present embodiment, the anode current collector layer 13, the anode composite material layer 14, the separator layer 15, the cathode composite material layer 16, the cathode current collector layer 17, the cathode composite material layer 16, the separator layer 15, the anode composite material layer 14, and the anode current collector layer 13 are laminated in this order (may be referred to as "laminate A"). The insulating members 18 are disposed on side surfaces of the laminate A, on sides where the anode terminal 30 and the cathode terminal 31 are disposed, and the protective members 20 are disposed on other side surfaces.

Each of the configurations, and relations thereof, will be described below.

Note that in each layer making up the laminate A, and in the laminate A, the broad surfaces that are layered will be referred to as "surfaces" (hence, each layer and the laminate A have two surfaces (front and back)), and faces that make up a thickness spanning between these two surfaces will be referred to as "side surfaces" (hence, in a case of a shape that is a square in plan view, there will be four side surfaces).

1.1. Outer Encasement Member

In the present embodiment, the outer encasement member 11 is made up of a sheet-like member, and in the present form, the outer encasement member 11 includes a first outer encasement member 11a and a second outer encasement member 11b. The electrode body 12, and part of each of the anode terminal 30 and the cathode terminal 31 are enveloped between the first outer encasement member 11a and the second outer encasement member 11b, and the first outer encasement member 11a and outer peripheral end portions of the surfaces of the second outer encasement member 11b are joined. Accordingly, the outer encasement member 11 has a pouch shape, and the electrode body 12 is enveloped and sealed therein.

The first outer encasement member 11a has a square shape in plan view, and has a recess 11aa (an opening of the recess 11aa is on reverse side of the plane of the drawing in the view in FIG. 3, and thus is hidden from sight), and the electrode body 12 is accommodated within the recess 11aa. A joint portion 11ab is provided on an outer peripheral edge of the recess 11aa, projecting from the edge, and the joint portion 11ab and the outer peripheral end portions of the surfaces of the second outer encasement member 11b are joined.

The second outer encasement member 11b is a member that is sheet-like, and has a square shape overall in plan view. As described above, the outer peripheral end portion of a face of the second outer encasement member 11b facing the first outer encasement member 11a is overlapped with and joined to the joint portion 11ab of the first outer encasement member 11.

In the present embodiment, the first outer encasement member 11a and the second outer encasement member 11b are made of laminate sheets. The term "laminate sheet" here refers to a sheet having a metal layer and a sealant material layer. Examples of metal and so forth used for the laminate sheet include aluminum and stainless steel, and examples of material used for the sealant material layer include polypropylene, polyethylene, polystyrene, polyvinyl chloride, and so forth, which are thermoplastic resins.

The method of joining the first outer encasement member 11a and the second outer encasement member 11b, i.e., the method of joining the laminate sheets, is not limited in particular, and known methods can be used. Specific examples thereof include a method of welding the sealant material layers of the laminate sheet to each other (e.g., hot plate welding, ultrasound welding, vibration welding, laser welding, and so forth) and adhesion by an adhesive.

1.2. Anode Current Collector Layer

The anode current collector layer 13 is laminated on the anode composite material layer 14 and collects electricity from the anode composite material layer 14. The anode current collector layer 13 is film-like and has a square shape overall in plan view, and is, in the present embodiment, made up of an anode current collector foil 13a that is a metal foil, and a carbon layer 13b laminated on the anode current collector foil 13a. The carbon layer 13b is laminated on the anode composite material layer 14, whereby the current collector layer 13 is laminated on the composite material layer 14.

Examples of the material making up the anode current collector foil 13a include stainless steel, aluminum, nickel, iron, and titanium, and the carbon layer 13b is made of a material containing carbon.

Now, the anode current collector foil 13a of the anode current collector layer 13 has an extending portion 13c of which one end side extends far beyond the other layers making up the laminate A. The extending portion 13c enables multiple anode current collector layers 13 to be connected, and the anode terminal 30 to be disposed.

1.3. Anode Composite Material Layer

The anode current collector layer 13 is laminated on one surface of the anode composite material layer 14, and the separator layer 15 is laminated on the other surface thereof. The anode composite material layer 14 is sheet-like, and has a square shape overall in plan view.

The anode composite material layer 14 is a layer containing an anode active material, and may further contain at least one of a solid electrolyte material, a conductive material, and a binder, as necessary.

A known active material may be used as the anode active material. Examples include cobalt-based materials ($LiCoO_2$, etc.), nickel-based materials ($LiNiO_2$, etc.), manganese-based materials ($LiMn_2O_4$, $Li_2Mn_2O_3$, etc.), iron-phosphate-based materials ($LiFePO_4$, $Li_2FeP_2O_7$, etc.), NCA-based materials (compounds of nickel, cobalt, and aluminum), NMC-based materials (compounds of nickel, manganese, and cobalt), and so forth. More specific examples include $LiNi_{1/3}Co_{1/3}Mn_{1/3}O_2$ and so forth.

The surface of the anode active material may be coated with an oxide layer such as a lithium niobate layer, a lithium titanate layer, a lithium phosphate layer, or the like.

The solid electrolyte is preferably an inorganic solid electrolyte. This is because ionic conductivity thereof is high and heat resistance thereof is excellent, as compared with organic polymer electrolytes. Examples of the inorganic solid electrolyte include sulfide solid electrolytes, oxide solid electrolytes, and so forth.

Examples of the sulfide solid electrolyte material having Lithium-ion conductivity include $Li_2S$—$P_2S_5$, $Li_2S$—$P_2S_5$—$LiI$, $Li_2S$—$P_2S_5$—$Li_2O$, $Li_2S$—$P_2S_5$—$Li_2O$—$LiI$, $Li_2S$—$SiS_2$, $Li_2S$—$SiS_2$—$LiI$, $Li_2S$—$SiS_2$—$LiBr$, $Li_2S$—$SiS_2$—$LiCl$, $Li_2S$—$SiS_2$—$B_2S_3$—$LiI$, $Li_2S$—$SiS_2$—$P_2S_5$—$LiI$, $Li_2S$—$B_2S_3$, $Li_2S$—$P_2S_5$—$Z_mS_n$ (in which m and n are positive numerals, and Z is any of Ge, Zn, and Ga), $Li_2S$—$GeS_2$, $Li_2S$—$SiS_2$—$Li_3PO_4$, $Li_2S$—$SiS_2$-$Li_xMO_y$, (in which x and y are positive numerals, and M is any of P, Si, Ge, B, Al, Ga, and In), and so forth. Note that the above notation "$Li_2S$—$P_2S_5$" means a sulfide solid electrolyte material using a raw material composition containing $Li_2S$ and $P_2S_5$, and this holds true regarding other notations as well.

On the other hand, examples of the oxide solid electrolyte material having Lithium-ion conductivity include compounds having a NASICON (an acronym for sodium (Na) Super Ionic Conductor) type structure, and so forth. Examples of compounds having a NASICON type structure include a compound (LAGP) represented by the general formula $Li_{1+x}Al_xGe_{2-x}(PO_4)_3$ ($0 \leq x \leq 2$), a compound (LATP) represented by a general formula $Li_{1+x}Al_xTi_{2-x}(PO_4)_3$ ($0 \leq x \leq 2$), and so forth. Other examples of the oxide solid electrolyte material include LiLaTiO (e.g., $Li_{0.34}La_{0.51}TiO_3$), UPON (e.g., $Li_{2.9}PO_{3.3}N_{0.46}$), LiLaZrO (e.g., $Li_7La_3Zr_2O_{12}$), and so forth.

The binder is not limited in particular as long as it is chemically and electrically stable, and examples thereof include a fluorine-based binder such as polyvinylidene fluoride (PVDF), polytetrafluoroethylene (PTFE), and so forth, rubber-based binders such as styrene-butadiene rubber (SBR) and so forth, olefin-based binders such as polypropylene (PP), polyethylene (PE), and so forth, and cellulose-based binders such as carboxymethyl cellulose (CMC) and so forth.

Examples of the conductive material that can be used include carbon materials such as acetylene black (AB), Ketjen black, carbon fiber, and so forth, and metal materials such as nickel, aluminum, stainless steel, and so forth.

Also, the thickness of the anode composite material layer 14 preferably is, for example, no less than 0.1 μm and no more than 1 mm or less, and more preferably no less than 1 μm and no more than 150 μm.

1.4. Separator Layer

The separator layer (solid electrolyte layer) 15 is sheet-like and has a square shape overall in plan view, is disposed between the anode composite material layer 14 and the cathode composite material layer 16, and is a layer containing the solid electrolyte material. The separator layer 15 contains at least the solid electrolyte material. The solid electrolyte material can be thought of in the same way as the solid electrolyte material described regarding the anode composite material layer 14.

1.5. Cathode Composite Material Layer

The cathode composite material layer 16 is a layer containing at least a cathode active material. The cathode composite material layer 16 may contain a binder, a conductive material, and a solid electrolyte material, as necessary. The binder, the conductive material, and the solid electrolyte material can be thought of in the same way as those in the anode composite material layer 14.

When making up a lithium-ion battery, examples of the cathode active material include carbon materials such as graphite, hard carbon, and so forth, various types of oxides such as lithium titanate and so forth, silicon (Si) and Si alloys, or metallic lithium, lithium alloys and so forth, but are not limited in particular thereto.

The cathode composite material layer 16 is sheet-like and has a square shape overall in plan view, with the separator layer 15 laminated on one surface and the cathode current collector layer 17 laminated on the other surface.

Also, the thickness of the cathode composite material layer 16 preferably is, for example, no less than 0.1 μm and no more than 1 mm or less, and more preferably no less than 1 μm and no more than 150 μm.

1.6. Cathode Current Collector Layer

The cathode current collector layer 17 is laminated on the cathode composite material layer 16 and collects electricity from the cathode composite material layer 16. The cathode current collector layer 17 is film-like and has a square shape overall in plan view, and can be made of, for example, stainless steel, copper, nickel, carbon, or the like.

Now, the cathode current collector layer 17 has an extending portion 17c of which one end side extends far beyond the other layers making up the laminate A. The extending portion 17c enables multiple cathode current collector layers 17 to be connected, and the cathode terminal 31 to be disposed. In the present embodiment, the extending portion 17c is configured to extend from the side surface opposite to the extending portions 13c of the anode current collector layers 13, but is not limited to this, and may be configured with the extending portion 17c extending from the same side surface as the extending portions 13c.

1.7. Insulating Member

The insulating members 18 are members having electrically insulating properties, and are disposed covering the side surfaces of the laminate A where the extending portions 13c of the anode current collector layers 13 and the extending portion 17c of the cathode current collector layer 17 are present.

More specifically, as can be clearly seen from FIGS. 3 and 5, one of the insulating members 18 is disposed covering the side surfaces of the anode composite material layers 14, the separator layers 15, the cathode composite material layers 16, and the cathode current collector layer 17, which are the layers other than the anode current collector layers 13, on the side surface provided with the extending portions 13c of the anode current collector layers 13. On the other hand, the other of the insulating members 18 is disposed so as to cover the side surfaces of the anode composite material layers 14, the separator layers 15, the cathode composite material layers 16, and the anode current collector layers 13, which are the layers other than the cathode current collector layer 17, on the side surface provided with the extending portion 17c of the cathode current collector layer 17.

Providing the insulating members 18 enables short-circuiting between layers on the side surfaces where the insulating members 18 are disposed to be suppressed.

The material making up the insulating members 18 is not limited in particular, as long as it has electrical insulating properties, and various types of resins, such as for example, thermosetting resins, ultraviolet curing resins, thermoplastic resins, and so forth, can be used. Thermosetting resins are particularly preferable. As a specific example, using the same resin as underfill resin in the semiconductor manufacturing field is preferable. That is to say, an epoxy resin or the like can be used. Alternatively, an amine-based resin or the like can also be used.

1.8. Protective Member

Figure 7:
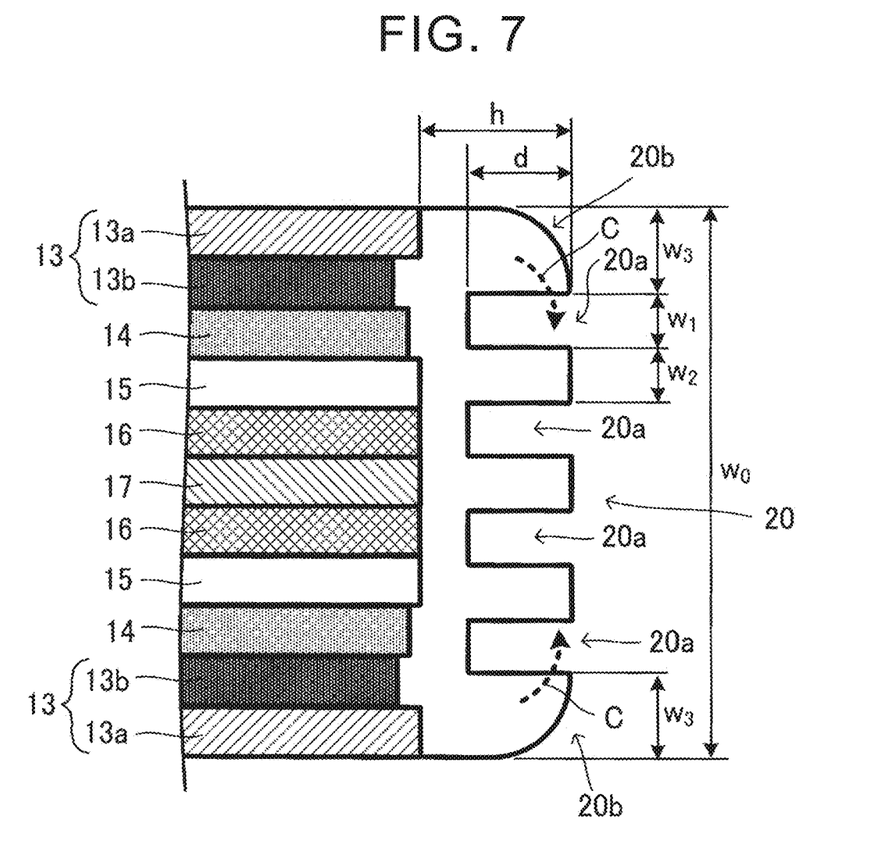
FIG. 7 is an enlarged view of part of FIG. 6.

The protective members 20 are members having electrically insulating properties, and are disposed covering the side surfaces of the laminate A where the extending portions 13c of the anode current collector layers 13 and the extending portion 17c of the cathode current collector layer 17 are not present. FIG. 7 is an enlarged view focusing on the vicinity of one of the protective members 20 in FIG. 6.

More specifically, as can be clearly seen from FIGS. 3, 6, and 7, the protective members 20 are disposed so as to cover the side surfaces of the anode current collector layers 13, the anode composite material layers 14, the separator layers 15, the cathode composite material layers 16, and the cathode current collector layer 17, on the sides of the laminate A on which the protective members 20 are disposed.

In the present embodiment, the protective members 20 are disposed on each of two side surfaces. Note that in the present embodiment, the extending portions 13c of the anode current collector layers 13 and the extending portion 17c of the cathode current collector layer 17 extend in opposite directions, and accordingly the protective members 20 are disposed on two side surfaces where these extending portions are not present. However, when the extending portions 13c of the anode current collector layers 13 and the extending portion 17c of the cathode current collector layer 17 extend from the same side surface of the laminate A, the protective members 20 can be disposed on three side surfaces of the laminate A where these extending portions are not present.

Also, each of the protective members 20 is provided with a groove 20a on a face opposite to the face on the side disposed on the side surface of the laminate A. The groove 20a is formed extending following the direction of a longitudinal direction in which the surface of each layer making up the laminate A extends, and when a plurality of grooves 20a is provided, the grooves 20a are arrayed following the direction in which the layers making up the laminate A are laminated.

A width $w_0$ of the protective members 20 (size in a thickness direction in which each of the layers of the laminate A is laminated, $w_0$ in FIG. 7) is preferably of a size that covers the entire side surfaces of the laminate A (side surfaces of a laminate B in the example described with reference to FIG. 8), or larger.

A length L of the protective members 20 (length in a direction in which the groove 20a extends, L in FIG. 4) that is also large enough to cover the entire side surfaces of the laminate A (excluding the extending portions 13c and the extending portion 17c) is sufficient, and depends on the length of the laminate A.

A height of the protective members 20 (size in a direction away from the laminate A, h in FIG. 7) that allows for the groove 20a to be provided is sufficient, but preferably is around no less than 1 mm and no more than 3 mm.

A width $w_1$ of the groove 20a and a width $w_2$ of portions other than the groove 20a (raised portions) are not limited in particular, as long as being capable of absorbing external force by being deformed by pressing force from the external force as described later, but preferably are no more than 0.5 mm. In particular, when $w_1$ is larger than 0.5 mm, part of the outer encasement member (laminate sheet) 11 may deeply enter into the groove 20a when the outer encasement member 11 is drawn to a vacuum to seal the electrode body 12 therein.

A depth d of the groove 20a denoted by d in FIG. 7 is not limited in particular, as long as being capable of absorbing external force by being deformed by pressing force from the external force as described later. However, the depth d preferably is no less than 30% and no more than 80% with respect to the height h of the protective member 20 denoted by h in FIG. 7 (when the height h differs depending on the position, the height of the smallest position other than an external corner portion 20b), and even more preferably is no less than 40% and no more than 60%.

Note that a bottom shape of the groove 20a is flat, as illustrated in the present embodiment, and does not have to have a curved portion (curvature) at an internal corner portion, but may be configured having a curved portion (curvature) at the internal corner portion. Further, the bottom may be a semicircle or an elliptic arc.

The layout of the grooves 20a is not limited in particular, and at least one groove 20a being provided is sufficient, but preferably at least one groove 20a is each provided at positions $w_3$ from one of both end portions in a width direction of the protective member 20. Here, $w_3$ is not limited in particular as long as external force can be absorbed by deforming by pressing force from the external force as described later, but preferably is no greater than 0.5 mm, in the same way as with $w_2$.

Also, the number of grooves 20a is not limited to two, and multiple grooves 20a may be provided with spacings therebetween. In doing so, the grooves 20a preferably are preferentially provided on both end sides of the protective member 20 in the width direction. This is because external force applied to the protective member 20 is often applied to the end portions. Note however, that the grooves 20a may be provided evenly over the entire width direction of the protective member 20.

Out of width-direction end portions of the protective member 20, corner shapes of the external corner portions 20b on a side opposite to a side disposed on the side surface of the laminate A preferably are chamfered shapes, i.e., straight chamfers (also known as "C chamfered shape") or rounded chamfers (also known as "R chamfered shape"). In other words, the external corner portions 20b preferably have inclined surfaces or curved surfaces. Thus, the risk of the external corner portions 20b perforating the outer encasement member 11 (laminate sheet) can be further reduced.

Note that the external corner portions 20b may be formed in the protective member 20 so as to connect the side surface direction and the surface direction of the laminate A.

The size of the chamfered shape is not limited in particular, but examples include an arc shape having radius of 0.1 mm in a rounded chamfer.

The material that the protective member 20 is made of is not limited in particular, as long as it has electrical insulating properties and can be appropriately elastically deformed as described later, and various types of resins, such as for example, thermosetting resins, ultraviolet curing resins, thermoplastic resins, and so forth, can be used. More specifically, the elastic modulus thereof is preferably 1 MPa or more and 500 MPa or less. With an elastic modulus lower than this, the deformation of the protective member 20 tends to be too great, and the role of protecting the laminate A will be reduced. With an elastic modulus higher than this, the protective member 20 becomes hard with respect to the outer encasement member 11, and the likelihood of the outer encasement member being torn increases.

1.9. Anode Terminal, Cathode Terminal

The anode terminal 30 and the cathode terminal 31 are members that have conductivity, and each is a terminal for externally electrically connecting a respective pole. One end of the anode terminal 30 is electrically connected to the extending portions 13c of the anode current collector layers 13, and the other end penetrates the joint portion between the first outer encasement member 11a and the second outer encasement member 11b and is externally exposed.

One end of the cathode terminal 31 is electrically connected to the extending portion 17c of the cathode current collector layer 17, and the other end penetrates the joint portion between the first outer encasement member 11a and the second outer encasement member 11b and is externally exposed.

2. Manufacturing

The all-solid-state battery 10 can be manufactured by known methods, except for the protective member 20. Further, the protective member 20 can be manufactured by pouring a molten material into a mold, and curing by an appropriate method, although not limited to this in particular. Curing of thermoplastic resins can be performed by cooling, and curing of ultraviolet curing resins can be performed by irradiation with ultraviolet rays.

As described above, the electrode body 12 is housed inside the recess 11aa of the first outer encasement member 11a, and the joint portion 11ab provided on the outer peripheral edge of the recess 11aa and the outer peripheral end portions of the surfaces of the second outer encasement member 11b are joined. At this time, the inside of the recess 11aa is drawn to a vacuum, for deaerating thereof.

3. Effects, Etc

According to the all-solid-state battery 10 of the present disclosure, the side surfaces of the laminate A are protected by the protective members 20 provided thereto. Also, when the electrode body 12 is sealed in the outer encasement member 11, the protective members 20 are interposed between the corners of the laminate A and the outer encasement member 11 when drawn to a vacuum as described above, and accordingly the corners of the laminate A do not come into contact with the outer encasement member 11, whereby tearing of the outer encasement member 11 can be suppressed.

At this time, the protective member 20 and the outer encasement member 11 come into contact with each other, and the protective member 20 is pressed by the outer encasement member 11, but the protective member 20 has the grooves 20a formed therein, and accordingly the end portions of the protective members 20 can be deformed as indicated by arrows C in FIG. 7 to absorb the pressing force and reduce the load on the outer encasement member 11. This enables tearing of the outer encasement member 11 to be suppressed with more sureness.

Moreover, providing chamfered shapes to the external corner portions 20b of the protective members 20 enables stress concentration due to contact with the outer encasement member 11 at the external corner portions 20b to be reduced, and accordingly tearing of the outer encasement member 11 can be further suppressed.

Although an arrangement has been described in the above embodiment in which the cathode composite material layers 16, the separator layers 15, the anode composite material layers 14, and the anode current collector layers 13 are laminated on each of the two surfaces of one cathode current collector layer 17, to make up the laminate A, this is not limiting, and a configuration may be made in which laminating of the layers is further repeated. FIG. 8 is an explanatory diagram.

Figure 8:
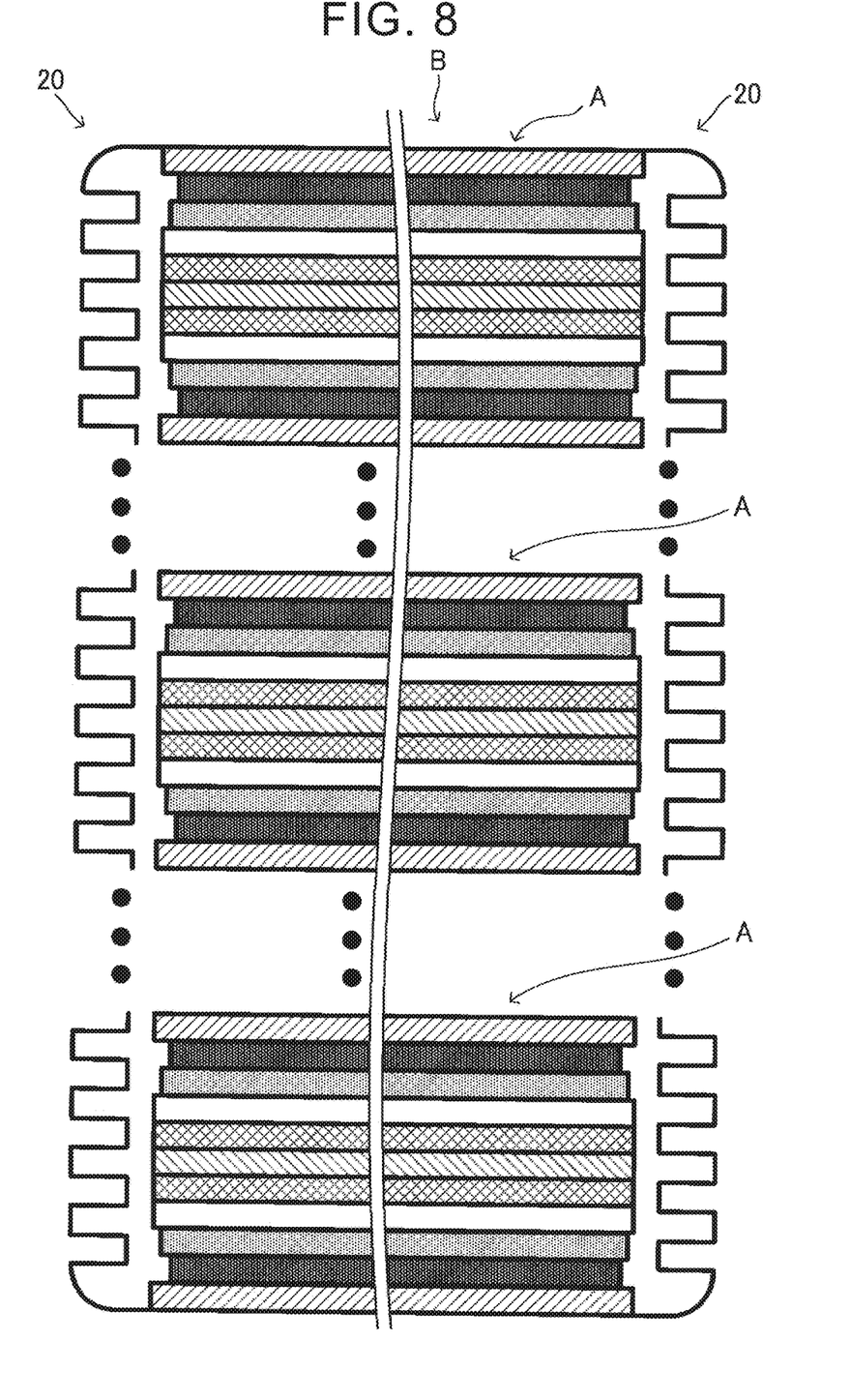
FIG. 8 is a diagram illustrating an embodiment in which a laminate A is repeatedly laminated.

In the example in FIG. 8, a plurality of the laminates A is repeatedly laminated to form the laminate B, with one protective member 20 disposed on each of the two side surfaces of the laminate B. The same effects as described above can be obtained by such an embodiment as well. Accordingly, in this example, one protective member 20 is disposed to each side surface of the laminate B, spanning the side surfaces of the laminates A that are stacked.

4. Examples

4.1. Form of Laminate

In accordance with the example of the laminate B in FIG. 8, 17 laminates A were repeatedly laminated to obtain a laminate B having a thickness of 2.89 mm.

4.2. Form of Outer Encasement Member

As an outer encasement member, the above-described outer encasement member 11 was formed of a laminate sheet. The recess of the first outer encasement member was formed by embossing.

4.3. Form of Protective Member

Figure 9:
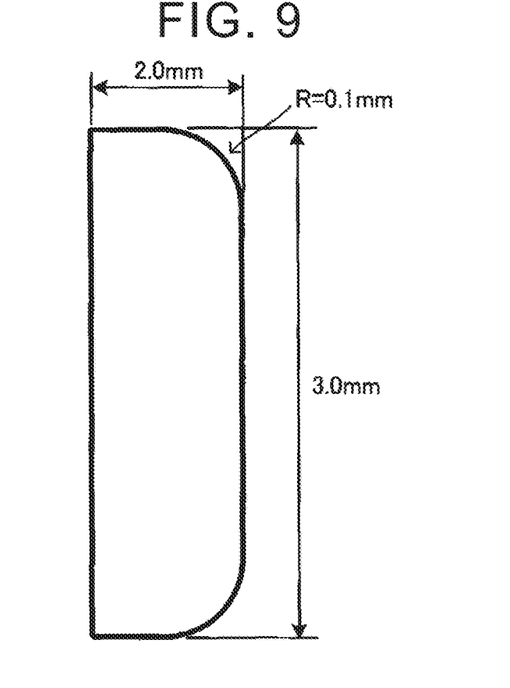
FIG. 9 is a diagram illustrating a form of a protective member in Comparative Example 1.
Figure 10:
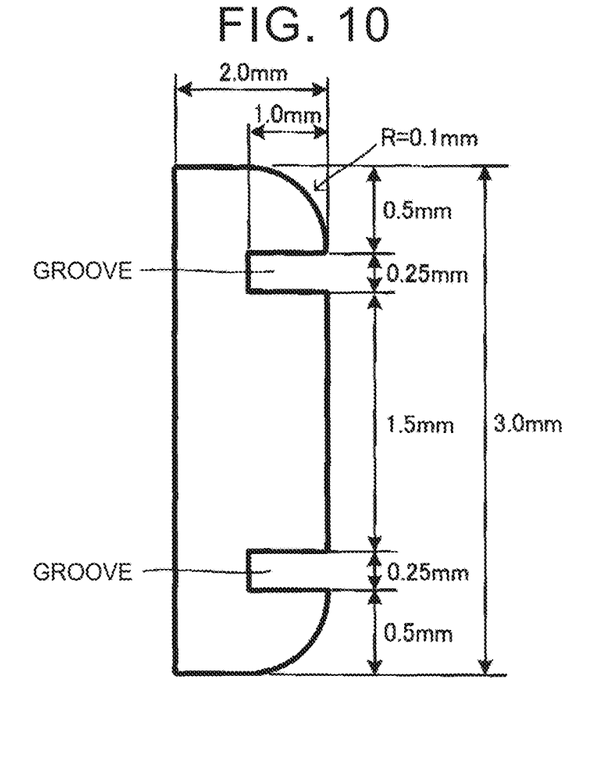
FIG. 10 is a diagram illustrating a form of a protective member in Example 1.
Figure 11:
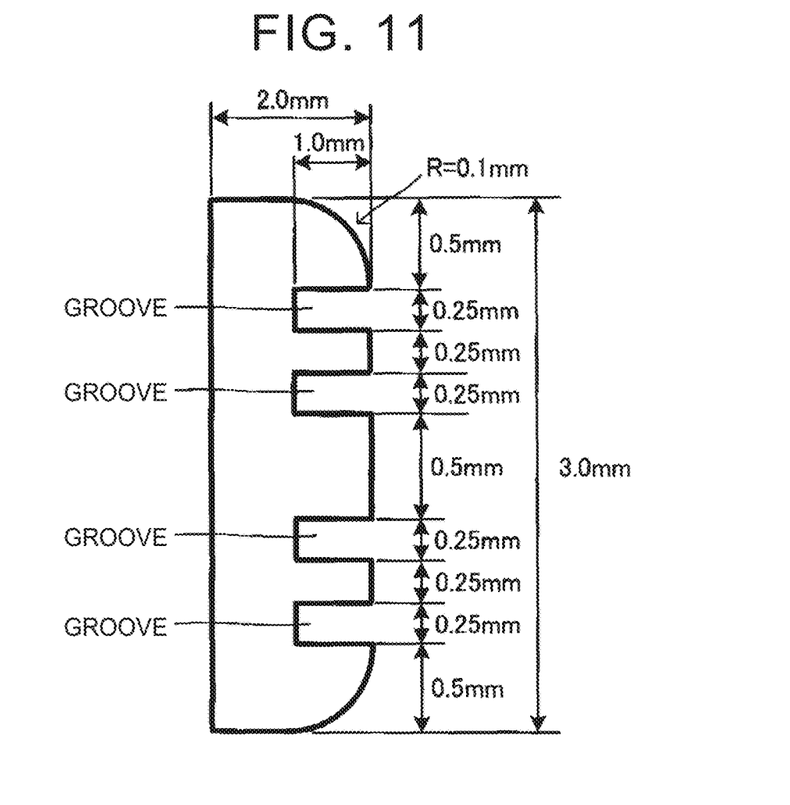
FIG. 11 is a diagram illustrating a form of a protective member in Example 2.

Protective members according to Examples 1 and 2 and Comparative Example 1 were fabricated and disposed on each of the two side surfaces of the laminate B fabricated above. The protective members were formed of an ultraviolet curing resin. FIG. 9 illustrates the form of the protective member provided to the test piece according to Comparative Example 1, FIG. 10 illustrates that according to Example 1, and FIG. 11 illustrates that according to Example 2. Note that the length of each protective member (length indicated by L in FIG. 4) was 225 mm, and the chamfered shape was an arc shape of a rounded chamfer with a radius of 0.1 mm in size. Further, in each Example, the width of the protective member was 3.0 mm, and thus formed slightly larger than that of the laminate. As can be seen from FIG. 9, in Comparative Example 1, the protective member has no groove. As can be seen from FIG. 10, in Example 1, two grooves in total were provided, one at each end portion of the protective member in the width direction.

As can be seen from FIG. 11, in Example 2, four grooves in total were provided, two at each end portion of the protective member in the width direction.

4.4. Test Method

The test performed was a heat cycle test. In this test, each test piece was subjected to one reciprocation in temperature between −15° C. and 95° C. with uniform temperature change over one cycle, with one cycle being one hour, and this was performed a plurality of times (a plurality of cycles).

4.5. Results

Figure 12:
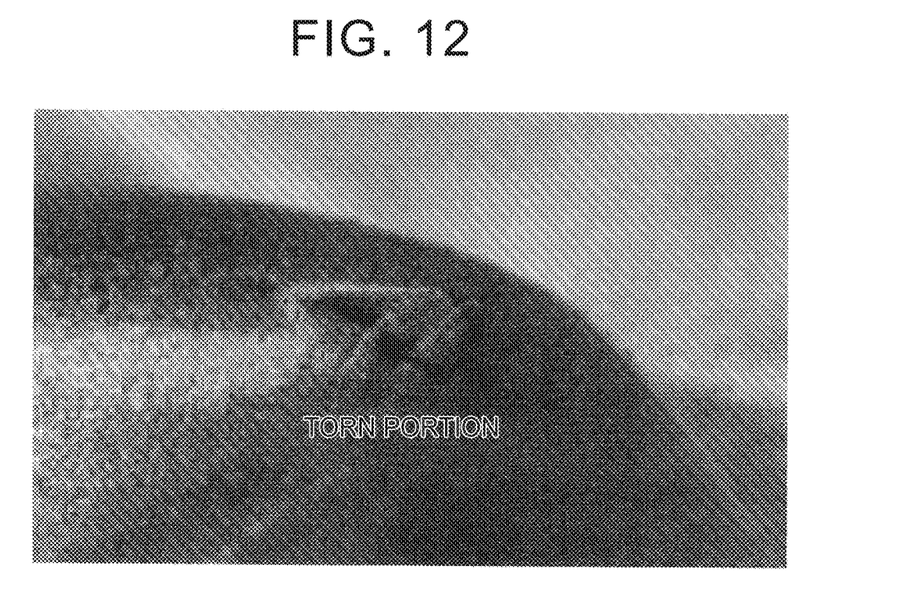
FIG. 12 is a diagram illustrating a tear in an outer encasement member in Comparative Example 1.

As a result of the tests, the outer encasement member was torn at the contact portion between the external corner portion of the protective member and the outer encasement member in Comparative Example 1, as illustrated in FIG. 12, but in Examples 1 and 2, no tearing of the outer encasement member occurred over the same count of cycles as Comparative Example 1.

What is claimed is:
1. An all-solid-state battery, comprising:
   an electrode body that is provided with a laminate including an anode current collector layer, an anode composite material layer, a solid electrolyte layer, a cathode composite material layer, and a cathode current collector layer;
   an outer encasement member that envelops the electrode body; and
   a protective member with electrically insulating properties that is disposed on a side surface of the laminate, wherein the protective member has a height of no less than 1 mm and no more than 3 mm, comprises resin, and has a groove extending along a direction in which a surface of the laminate extends;
   wherein a width of the groove is no less than 0.25 mm and no more than 0.5 mm, and a depth of the groove is no less than 30% and no more than 80% with respect to the height of the protective member.

2. The all-solid-state battery according to claim 1, wherein a plurality of the grooves is arrayed in a laminating direction of the laminate.

3. The all-solid-state battery according to claim 2, wherein at least one of the grooves is located at a position that is located away by a predetermined distance in the laminating direction from one of both end portions of the protective member in the laminating direction.

4. The all-solid-state battery of claim 2, wherein each of the plurality of grooves have substantially the same depth.

5. The all-solid-state battery of claim 2, wherein the plurality of grooves are arrayed following a direction in which the layers making up the laminate are laminated.

6. The all-solid-state battery according to claim 1, wherein an elastic modulus of the protective member is 1 MPa or more and 500 MPa or less.

7. The all-solid-state battery according to claim 1, wherein an external corner portion at an end portion of the protective member in a laminating direction of the laminate is provided with an inclined surface or a curved surface.

8. The all-solid-state battery according to claim 7, wherein;
   the protective member includes a first end portion in a width direction of the protective member and a second end portion in the width direction,
   the external corner portion is located on the second end portion,
   the first end portion is disposed on a side of the protective member that is disposed on the side surface of the laminate, and
   the second end portion is disposed on a side of the protective member that is opposite from the first end portion.

9. The all-solid-state battery according to claim 7, wherein the external corner portion is located at a position in contact with the outer encasement member.

10. The all-solid-state battery of claim 1, wherein the protective member has two or more grooves on one side surface of the protective member.

11. The all-solid-state battery of claim 1, wherein the protective member comprises a convex curve at a top and a bottom edge.

12. The all-solid-state battery of claim 1, wherein a depth of the groove is 1 mm.

13. The all-solid-state battery of claim 1, wherein a width of the groove is 0.25 mm.

* * * * *